Patented July 4, 1944

2,352,648

UNITED STATES PATENT OFFICE 2,352,648

HORMONE INTERMEDIATES AND PREPARATION OF SAME

Russell Earl Marker, State College, Pa., assignor to Parke, Davis & Company, Detroit, Mich., a corporation of Michigan No Drawing. Application June 30, 1941,
Serial No. 400,559

11 Claims. (Cl. 260—397.5)

This invention relates to new hormone intermediates and preparation of the same. More particularly it relates to the preparation of a new class of hormone intermediates which may be designated as 16,20-dihydroxypregnane compounds.

In my copending application Serial No. 393,667, filed May 15, 1941, it is shown that steroidal sapogenins can be converted into a new class of compounds which I designate as pseudo-sapogenins.

The pseudo-sapogenins are characterized by the fact that they contain a new type of side chain which undergoes distinctive reactions. Thus, the pseudo-sapogenins are unsaturated to bromine and therefore readily decolorize a solution of bromine in acetic acid. On treatment with acids, for example, with alcoholic hydrochloric acid, the pseudo-sapogenins are isomerized to the corresponding steroidal sapogenins. The side chain of the pseudo-sapogenins contains a reactive hydroxyl group which may be acylated, for example, acetylated.

The pseudo-sapogenins can be hydrogenated, for example, as set forth in my copending application Serial No. 382,450, filed March 8, 1941, to give another new class of compounds which I have designated as exo-dihydro-pseudo-sapogenins. In contrast to the pseudo-sapogenins, the exo-dihydro-pseudo-sapogenins show no unsaturation to bromine in acetic acid, nor are they affected by alcoholic hydrochloric acid. Like the pseudo-sapogenins, however, the exo-dihydro-pseudo-sapogenins contain in the side chain a reactive hydroxyl group which may be acylated, for example, acetylated.

It is believed that the properties of the pseudo-sapogenins are best explained if the side chain attached to ring D of the cyclopentanoperhydrophenanthrene nucleus be represented by one of the following partial formulae:

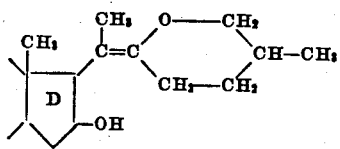

I

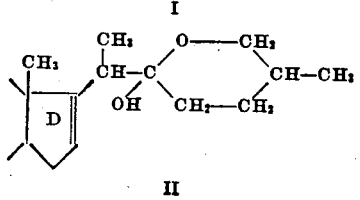

II

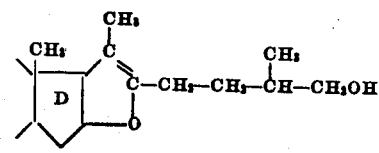

III

Of these formulae, II and III best explain the formation of the exo-dihydro-pseudo-sapogenins.

It is believed that the properties of the exo-dihydro-pseudo-sapogenins are best explained if the side chain attached to ring D of the cyclopentanoperhydrophenanthrene nucleus be represented by one of the following formulae:

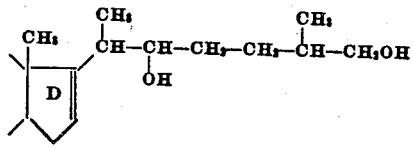

IV

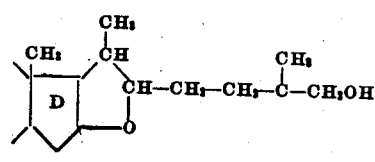

V

Of these, V seems to account best for the transformations described in the present invention.

It will be observed that the partial Formulae I, II, III, IV and V all contain a reactive hydroxyl group. This hydroxyl group may be acylated to yield compounds which may then be designated as exo-acylates.

In the case of both the terms exo-acylate and exo-dihydro-pseudo-sapogenin, the prefix "exo" has the same significance that it does in other branches of organic chemistry, namely, that the particular function involved is exterior to a ring system and in a position not known with greater certainty.

In the copending application of Russell Earl Marker, Harry Means Crooks, Jr., and Eugene Leroy Wittle, Serial No. 393,666, filed May 15, 1941, there is described the oxidation of pseudo-sapogenin exo-acylates and of exo-dihydro-pseudo-sapogenin exo-acylates to give a new class of esters. These new esters are designated 20-keto - 16 - (δ-acyloxyisocaproöxy)pregnane compounds and they may be represented by the partial formula:

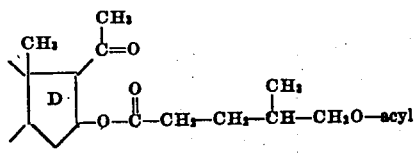

VI

These new 20-keto-16-(δ-acyloxyisocaproöxy)-pregnane compounds are readily hydrolyzed either by acidic or alkaline reagents to give Δ¹⁶-20-keto-pregnane compounds which may be represented by the following partial structural formula:

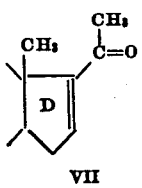

VII

In all of the foregoing formulae (I to VII inclusive) and in other partial formulae which may follow, it will be understood that only the new distinctive structural features of my new compounds are indicated and that the structure in regard to rings A and B may be of any type known in steroid chemistry.

Now I have discovered that when the new esters, that is to say the 20-keto-16-(δ)-acyloxyisocaproöxypregnane compounds described in the copending application Serial No. 393,666, filed May 15, 1941, are reduced there are obtained useful intermediates for the preparation of hormones.

My invention may be practiced according to any of the following ways:

The 20-keto-16-(δ-acyloxyisocaproöxy-)-pregnane compounds may be catalytically hydrogenated, as for example, by shaking the 20-keto-16-(δ-acyloxyisocaproöxy-)-pregnane compound with platinum oxide and acetic acid in a hydrogen atmosphere for about an hour at room temperature.

In an alternative mode of reduction the 20-keto-16-(δ-acyloxyisocaproöxy-)-pregnane compound may be reduced by treatment with the combination of (a) a primary or secondary alcohol, and (b) an aluminum alcoholate or a compound of the formula Z—Mg—OR, where Z is an anion such as chloride, sulfate, or p-toluenesulfonate, Mg is magnesium, and OR is an alcoholate group such as isopropylate, t-butylate, and the like.

Reduction of the 20-keto-16-(δ-acyloxyisocaproöxy-)-pregnane compound according to either of the methods mentioned above leads to the formation of the same type of compound, namely, the corresponding 20(β)hydroxy-16-(δ-acyloxyisocaproöxy-)-pregnane compound which may be represented by the structural formula,

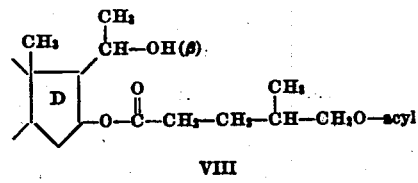

VIII

In most instances it is convenient to treat the compounds of the structure VIII with hydrolytic agents such as acidic or alkaline reagents so as to remove the ester group at C₁₆, thereby forming 20(δ),16-dihydroxypregnane compounds representable by the following partial formula,

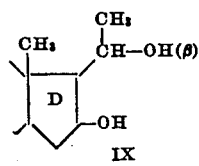

IX

It will be noted in accordance with the foregoing paragraphs that one feature of my invention comprises the reduction by non-hydrolytic reagents of a 20-keto-16-(δ-acyloxyisocaproöxy-)-pregnane compound and subsequent treatment with a hydrolytic agent to obtain a 20(β),16-dihydroxypregnane compound.

Instead of using non-hydrolytic reducing agents I may employ reducing agents which also have a hydrolytic action. In these cases the oxygen atom at C₁₆ is completely removed.

Thus, reduction of a 20-keto-16-(δ-acyloxyisocaproöxy-)-pregnane compound with the combination of an alkali metal and a alcohol or other substance containing reactive hydrogen, for example, the combination of sodium metal and ethyl alcohol, leads to the formation of a 20(α) hydroxy-pregnane compound which may be represented by the following partial formula,

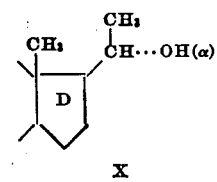

X

According to yet another modification, my invention may be practiced as follows: The 20-keto-16-(δ-acyloxyisocaproöxy-)-pregnane compound is subjected to hydrolytic treatment with an acidic or an alkaline reagent thereby forming a Δ¹⁶-20-keto-pregnene compound and the latter is reduced then with the combination of (a) a primary or secondary alcohol and (b) an aluminum alcoholate or a compound of the formula Z—Mg—OR, where Z is a anion such as chloride, sulfate, or p-toluene-sulfonate, Mg is magnesium, and OR is an alcoholate group such as isopropylate, t-butylate, and the like. Thus there is obtained a Δ¹⁶-20-(β)-hydroxypregnene compound which may be represented by the following partial formula:

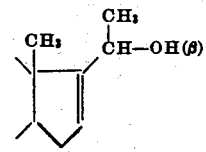

XI

On catalytic hydrogenation, compounds of the type XI are reduced to 20-(β)-hydroxypregnane compounds which may be represented by the following partial formula,

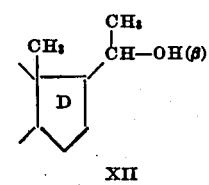

XII

Where the terms 20-(α)-hydroxy and 20-(β)-hydroxy occur in this specification it will be understood that these terms refer to the two epimers theoretically possible. See further R. E. Marker et al., J. Am. Chem. Soc., 59, 2291 (1937).

It will be appreciated, in view of what is disclosed, that my invention comprehends a new class of steroids useful as intermediates for the preparation of hormones. This new class of steroids may be designated as 20,(β),16-dihydroxy-pregnane compounds. As already indicated, these new compounds may have in rings A and B of the steroid nucleus almost any of the structural features known in steroid chemistry. Thus, rings A and B may be saturated or unsaturated and may be unsubstituted or may bear substituents such as halogen, hydroxyl, carboxyl, amino, ether or like groups or groups hydrolyzable to these.

My invention also comprehends derivatives of these 20, (β), 16-dihydroxypregnane compounds, said derivatives being hydrolyzable to yield said 20, (β), 16-dihydroxypregnane compounds. These derivatives comprise, for example, esters and ethers such as the acetates, benzoates, stearates, benzyl ethers and the like. They are prepared, for example, by the action of acylating or etherifying agents on the parent carbinols.

Generally, the new compounds of my invention are representable by the following formula,

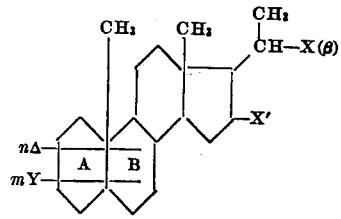

where X and X' are members of the class consisting of hydroxyl and groups hydrolyzable to hydroxyl; where the symbol nΔ represents n carbon-to-carbon double bonds in the A—B portion of the steroid nucleus, n having one of the values 0, 1, 2 and 3; and where the symbol mY represents m substituents attached to the methylene carbon atoms of the A—B portion of the steroid nucleus, said substituents being selected from the class consisting of

and groups hydrolyzable to

m having one of the values 0, 1, 2 and 3, and m and n being so chosen that their sum, m+n, does not exceed the value 3.

My invention may be illustrated by the following examples.

*Example 1*

(a) Diosgenin is treated as set forth more fully in my copending application, Serial No. 382,451, filed March 8, 1941, for six to fifteen hours with acetic anhydride at 200° C., thereby forming pseudo-diosgenin diacetate. After crystallization from methanol, the pseudo-diosgenin diacetate has a melting point of 97–100° C.

(b) Pseudo-diosgenin diacetate is oxidized with chromic anhydride in acetic acid at 28° C., as set forth more fully in the copending application of Russell Earl Marker, Harry Means Crooks, Jr., and Eugene Le Roy Wittle, Serial No. 393,666, filed May 15, 1941. Thus there is obtained the corresponding 20-keto-16-(δ-acyloxy-isocaproöxy)-pregnane compound of melting point 85–86° C. This compound is believed to have the structure,

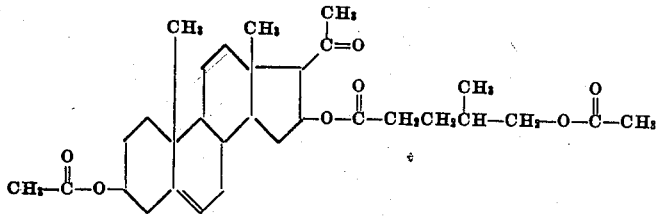

and it may be designated as Δ⁵-pregnenediol-3(β),16-one-20 3-acetate-16-(δ - acetoxy - isocaproate.

(c) To 2 g. of the product, melting point 85–86° C., designated as Δ⁵-pregnenediol-3-(β),16-one-20 3-acetate-16-(δ-acetoxy)-isocaproate, in 200 cc. of dry isopropyl alcohol is added 15 g. of sodium in small pieces. The mixture is refluxed for about an hour or until all the sodium has dissolved. Thereupon water is added and the mixture extracted well with ether. The ethereal layer is washed with water and then the ether is removed on a steam bath. The residue is crystallized from dilute acetone and from dilute methanol and thus yields Δ⁵ - pregnenediol-3(β),20-(α) of melting point 171–176° C.

The structure of the above product is shown by the fact that it may be hydrogenated in the presence of glacial acetic acid and a platinum oxide catalyst to yield allo-pregnanediol-3-(β),20-(α) of melting point 214–216° C.

*Example 2*

(a) A mixture of 5 g. of Δ⁵-pregnenediol-3-(β),16-one-20 3-acetate 16(δ-acetoxy)-isocaproate, 10 g. of aluminum isopropylate and 400 cc. of dry isopropyl alcohol is refluxed for seven hours. Then the mixture is distilled through a column over a period of five hours and the residue is refluxed with 500 cc. of 2% methanolic potassium hydroxide for thirty minutes. The mixture thus obtained is diluted with water and the precipitate collected and crystallized from methanol. Thus there is obtained Δ⁵-pregnenetriol-3-(β),16,20(β) of melting point 281–285° C.

When refluxed for thirty minutes with an excess of acetic anhydride it forms a triacetate which may be isolated in the usual manner. After crystallization from ether-pentane it has a melting point of 143° C.

(b) A mixture of 500 mgs. of the above Δ⁵-pregnenetriol-3(β),16,20(β) triacetate, 1 g. of platinum oxide catalyst and 200 cc. of glacial acetic acid is shaken under hydrogen at 45 lbs. pressure for one hour. The solution is filtered and the filtrate concentrated in vacuo. The residue is allo-pregnenetriol-3(β),16,20(β) triacetate. It is hydrolyzed by refluxing it for fifteen minutes with an excess of a 2% alcoholic potassium hydroxide solution. Then water is added and the precipitated material collected and recrystallized from alcohol. Thus there is obtained allo-pregnanetriol-3($\beta$),16,20($\beta$) of melting point 285–287° C.

The same allo-pregnanetriol-3($\beta$),16,20($\beta$), melting point 281–285° C., is obtained by reducing allo-pregnanediol-3($\beta$),16-one-20 3-acetate-16($\delta$-acetoxy)-isocaproate (obtained, for example, as described in Example 3a with aluminum isopropylate and isopropyl alcohol according to the method set forth in the first paragraph of this example.

Example 3

(a) Dihydro-pseudo-tigogenin diacetate, melting point 122–124° C., is prepared, for example, as set forth in my copending application, Serial No. 382,450, filed March 8, 1941, by the catalytic hydrogenation of pseudo-diosgenin diacetate.

(b) Dihydro-pseudo-tigogenin diacetate is oxidized with chromic anhydride in acetic acid at 28° C., as set forth more fully in the copending application of Russell Earl Marker, Harry Means Crooks, Jr., and Eugene Le Roy Wittle, Serial No. 393,666, filed May 15, 1941. Thus there is obtained the compound of melting point 102–104° C. representable by the following formula,

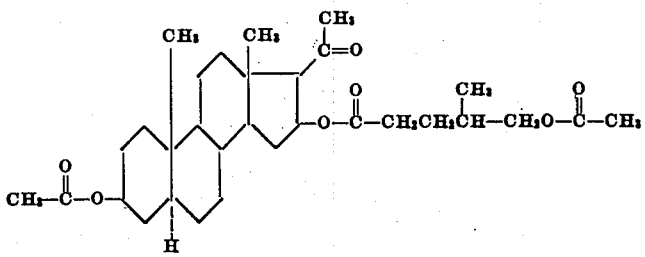

This compound may be designated as allo-pregnanediol-3($\beta$)-16-one-20 3-acetate 16-($\delta$-acetoxy)-isocaproate.

(c) The substance of melting point 102–104° C. designated as allo-pregnanediol-3($\beta$)-16-one-20 3-acetate-16($\delta$-acetoxy)-isocaproate is hydrogenated by shaking 2 g. of it with 3 g. of platinum oxide catalyst in 100 cc. of glacial acetic acid in a hydrogen atmosphere for two hours at room temperature. At the end of this time, the temperature is raised to 70° C. and the hydrogenation continued for an additional hour and a half. Then the solution is filtered and the solvent removed under reduced pressure. The residual syrup is allo-pregnanetriol-3($\beta$),16,20($\beta$) 3-monoacetate-16-($\delta$-acetoxy)-isocaproate of the following formula,

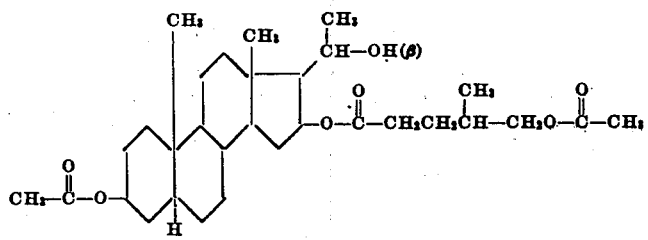

While this substance may be further purified by crystallization this is not necessary for the next step.

(d) The above residue is refluxed for fifteen minutes with a 2% alcoholic potassium hydroxide solution. Then the mixture is diluted with water and the precipitate collected and recrystallized from methanol. The substance thus obtained, melting point 285–288° C., has the empirical formula $C_{21}H_{36}O_3$ and is an allo-pregnanetriol-3($\beta$), 16,20($\beta$).

When the above triol is refluxed in acetic anhydride solution for thirty minutes and the acetylated mixture worked up, there is obtained an allo-pregnanetriol triacetate of melting point 161–163° C.

The same allo-pregnanetriol is obtained by the analogous catalytic hydrogenation and subsequent hydrolysis of the $\Delta^5$-pregnenediol-3($\beta$),16-one-20 3-acetate 16($\delta$-acetoxy)-isocaproate of melting point 84–86° C.

Example 4

(a) $\Delta^5$-pregnenediol-3($\beta$), 16-one-20 3-acetate-16($\delta$-acetoxy)-isocaproate, is obtained, for example, as described in Example 1, parts a and b.

(b) Three hundred milligrams of the above ester is refluxed in 20 cc. of alcohol with 300 mgs. of potassium hydroxide for thirty minutes. Then water is added and the organic material removed with ether. The ethereal layer is washed with water and then the solvent is removed to leave a residue which may be crystallized from acetone and from ethyl acetate. The product thus obtained is $\Delta^{5,16}$-pregnadienol-3-($\beta$)-one-20 of melting point 213–215° C. It does not depress in melting point when mixed with an authentic sample.

The same $\Delta^{5,16}$-pregnadienol-3-($\beta$)-one-20 may be obtained when the oxidation product above is refluxed with 10% alcoholic hydrochloric acid or with alcoholic potassium carbonate solution. In each case the yield is practically theoretical.

(c) A mixture of 1 g. of $\Delta^{5,16}$-pregnadienol-3($\beta$)-one-20, 5 g. of aluminum isopropylate and 100 cc. of dry isopropyl alcohol is refluxed for seven hours. Then the mixture is slowly distilled through a short column over a period of five hours. The residue is refluxed with an excess of 2% alcoholic potassium hydroxide solution for 30 minutes. Then the mixture is diluted with water, extracted with ether and the ethereal solution washed well with water. After removal of the ether, the residue is crystallized from ether and from dilute acetone to give $\Delta^{5,16}$-pregnadiendiol-3($\beta$),20($\beta$) of melting point 169–171° C.

On refluxing a sample of this diol with acetic anhydride and then removing the excess acetic anhydride by distillation in vacuo, there is obtained Δ⁵,¹⁶-pregnadiendiol-3(β),20(β) diacetate. After crystallization from dilute methanol this diacetate has M. P. 121° C.

The structure of this diol is proved by its hydrogenation to the known allo-pregnanediol-3(β), 20(β). For this purpose, a mixture of 50 mg. of Δ⁵,¹⁶-pregnadiendiol-3(β),20(β) in 20 cc. of ether and 20 cc. of methanol containing a few drops of acetic acid, shaken with 100 mg. of platinum oxide catalyst under pressure of 45 lbs. of hydrogen for one hour. Then the mixture is filtered and the solvents removed. The residue is crystallized from acetone, thereby yielding allo-pregnanediol-3(β), 20(β) of melting point 192–194° C.

Instead of using Δ⁵-pregnenediol-3(β),16-one-20 3-acetate 16-(δ-acetoxy)-isocaproate in this example, there may be used other similar esters derived by the oxidation of other esters of pseudo-diosgenin. For example, pseudo-diosgenin dipropionate, pseudo-diosgenin di-n-butyrate, pseudo-diosgenin dibenzoate or, in general, any pseudo-diosgenin diacylate may be oxidized to yield the corresponding ester and this reduced as described in this or other examples.

Again, instead of using in this example the ester obtained by oxidizing a diacylate of pseudo-diosgenin, there may be used esters obtained by oxidizing the diacylates of other pseudo-sapogenins. For instance, this example may be practiced according to parts b and c on allo-pregnanediol-3(β),16-one-20 3-acetate 16(δ-acetoxy)-isocaproate of melting point 102–4° C., as obtained by the oxidation of pseudo-tigogenin diacetate. Thus, hydrolysis of this ester according to part b gives Δ¹⁶-allo-pregnenol-3(β)-one-20 of melting point 204–206° C. Reduction of this compound with aluminum isopropylate and isopropyl alcohol according to the directions of part c above yields Δ¹⁶-allo-pregenediol-3(β),20(β) of melting point 188–190° C. This substance forms a diacetate of melting point 102–4° C.

The above examples are intended to illustrate but not to limit the scope of my invention. Other modes of employing my process apparent to those skilled in the art after this disclosure, are intended to fall within the scope of my invention and accordingly I wish to limit the scope of my invention only as indicated in the appended claims.

What I claim as my invention is:

1. Process for preparing hydroxy-pregnane derivatives which comprises subjecting a steroid having in ring D the structure

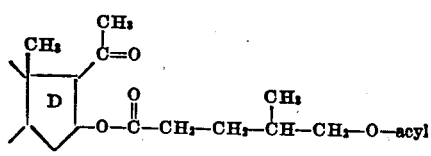

to the action of a non-hydrolytic reducing agent, thereby producing a steroid having in ring D the structure

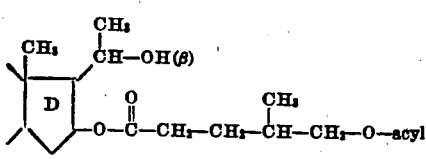

2. Process for preparing hydroxy-pregnane derivatives which comprises subjecting a steroid having in ring D the structure

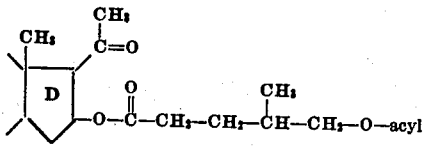

to the action of a non-hydrolytic reducing agent, thereby producing a steriod having in ring D the structure

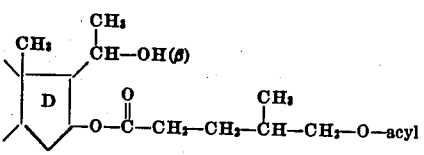

and hydrolyzing said steroid with production of a steroid having in ring D the structure

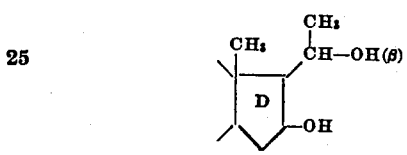

3. Process for preparing hydroxy-pregnane derivatives which comprises catalytically hydrogenating a steroid having in ring D the structure

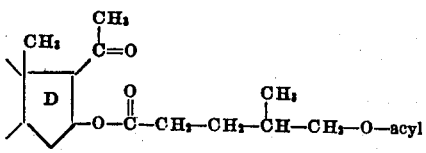

thereby producing a steroid having in ring D the structure

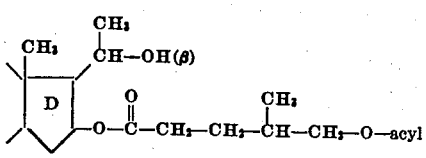

4. Process for preparing hydroxy-pregnane derivatives which comprises subjecting a steroid having in ring D the structure

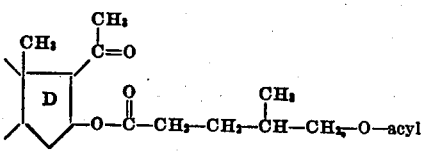

to the action of a member of the class consisting of primary alcohols and secondary alcohols, in combination with a member of the class consisting of aluminum alcoholates and compounds of the formula Z—Mg—OR, where Z is an anion and —OR is an alcoholate grouping, thereby producing a steroid, having in ring D the structure

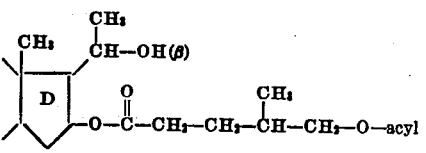

5. Process for preparing hydroxy-pregnane derivatives which comprises catalytically hydrogenating a steroid of the formula

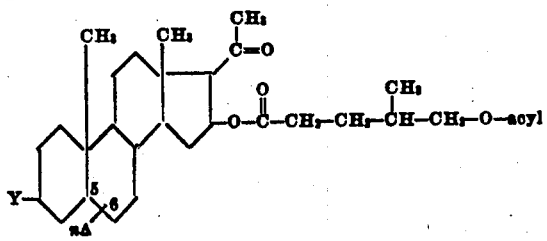

where $n\Delta$ represents $n$ carbon-to-carbon linkages included between $C_5$ and $C_6$, $n$ having one of the values 0 and 1, and Y is a member of the class consisting of hydroxyl and groups hydrolyzable to hydroxyl, thereby producing a steroid of the formula

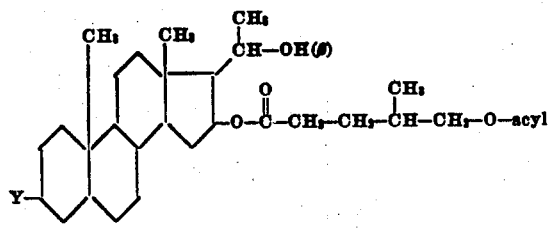

6. Process for preparing hydroxy-pregnane derivatives which comprises subjecting a steroid of the formula

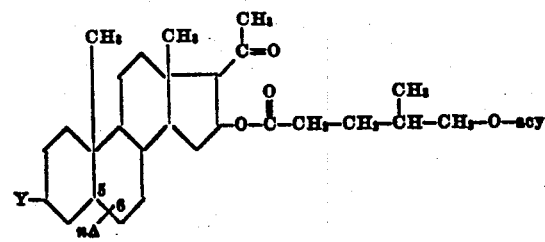

where $n\Delta$ represents $n$ carbon-to-carbon linkages included between $C_5$ and $C_6$, $n$ having one of the values 0 and 1, and Y is a member of the class consisting of hydroxyl and groups hydrolyzable to hydroxyl, to the action of a member of the class consisting of primary alcohols and secondary alcohols, in combination with a member of the class consisting of aluminum alcoholates and compounds of the formula Z—Mg—OR, where Z is an anion and —OR is an alcoholate grouping, thereby producing a steroid of the formula

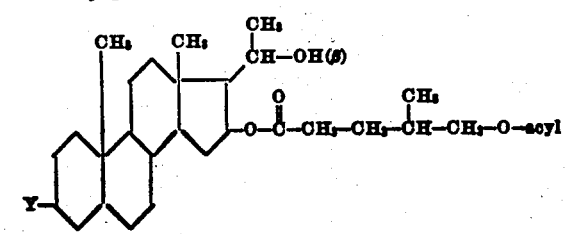

7. A compound representable by the formula

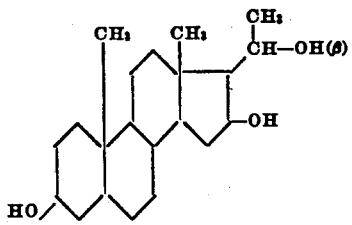

8. A compound representable by the formula

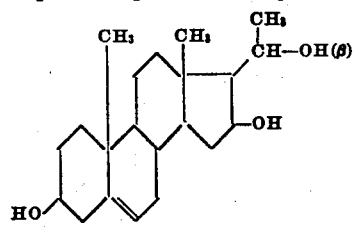

9. Allo-pregnanetriol-3-($\beta$), 16,20-($\beta$), having a melting point of approximately 285–288° C., and forming a triacetate having a melting point of approximately 161–163° C.

10. $\Delta^5$-pregnenetriol-3-($\beta$), 16,20-($\beta$), having a melting point of approximately 281–285° C. and forming a triacetate having a melting point of approximately 143° C.

11. A 20-($\beta$), 16-dihydroxypregnane compound representable by one of the formulas,

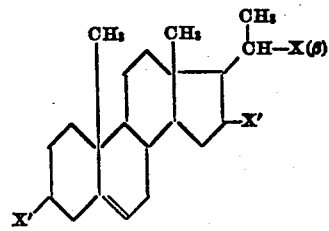

and

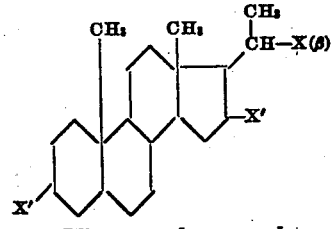

where X and X' are each a member of the class consisting of hydroxyl and groups hydrolyzable to hydroxyl.

RUSSELL EARL MARKER.